SPHERICAL ABERRATION  CHROMATIC  DISTORTION  ASTIGMATISM
SINE CONDITION (S.C)  ABERRATION

United States Patent Office 3,506,337
Patented Apr. 14, 1970

3,506,337
VARIABLE FOCAL LENGTH LENS SYSTEM SUITABLE FOR 35 MM. CAMERAS
Yasuo Takahashi, Tokyo-to, Japan, assignor to Asahi Kogaku Kogyo Kabushiki Kaisha, Tokyo-to, Japan
Filed Sept. 6, 1967, Ser. No. 665,831
Claims priority, application Japan, Sept. 14, 1966, 41/60,692
Int. Cl. G02b 15/16, 11/34
U.S. Cl. 350—184                     1 Claim

ABSTRACT OF THE DISCLOSURE

A simple zoo lens system of good optical characteristics includes successively a stationary first lens group of three successive negative, positive and positive lenses, an axially movable second lens group of three successive negative, negative and positive lenses the latter two lenses forming a cemented unit, a third lens group of two successive negative and positive lenses, the negative lens being axially movable, and a fourth stationary triplet lens groups of three successive positive, negative and positive lenses, the lens system satisfying the following conditions:

$$0.5F_1 < |r_7| < \infty, \ r_7 < 0$$

$$0.5 < |r_{12}|/|r_{15}| < 2$$

$$F_1/6 < |r_{12}| < F_1/2, \ r_{12} < 0$$

$$F_1/3.5 < f_9 < F_1/2.5$$

$$F_1 < |f_{9.10}| < F_1/0.3, \ f_{9.10} < 0$$

$$15 < \frac{\nu_2 + \nu_3}{2} - \nu_1 < 35$$

wherein, $F_1$ is the resultant length of the first three lenses;
$f_9$ is the focal length of the ninth lens;
$f_{9.10}$ is the resultant focal length of the ninth and tenth lenses;
$r_7$, $r_{12}$ and $r_{15}$ are the radii of curvatures respectively of the front face of the fourth lens, the front face of the seventh lens, and the rear face of the eighth lens; and
$\nu_1$, $\nu_2$ and $\nu_3$ are the Abbé values of the first second and third lenses respectively.

BACKGROUND OF THE INVENTION

The present invention relates generally to improvements in lens systems and it relates particularly to an improved variable focal length or zoom objective lens system.

The zoom lens systems of conventional design possess numerous drawbacks and disadvantages which render them generally unsuitable for still cameras with even as small an image size as that of the conventional 35 mm. camera. They are generally expensive and complicated devices and are usually poorly corrected over a wide part of their focal length range which is frequently very limited. Accordingly, zoom lenses for pictures of 35 mm. frame size or larger have found only a very limited application.

SUMMARY OF THE INVENTION

It is a principal object of the present invention to provide an improved lens system.

Another object of the present invention is to provide an improved variable focal length or zoom lens system.

Still another object of the present invention is to provide an improved zoom lens system which is highly suitable as an objective for the conventional 35 mm. camera.

A further object of the present invention is to provide an improved lens system of the above nature characterized by the small number of lens required and the consequent simplicity and low cost, a wide range of focal length variation, and a high degree of compensation and correction over its focal length variation in spite of the small number of lenses employed.

In a sense the present invention contemplates the provision of a variable focal length lens system comprising eleven lenses and satisfying the following conditions:

(1)  $\quad 0.5F_1 < |r_7| < \infty, \ r_7 < 0$ (2)  $\quad 0.5 < |r_{12}|/|r_{15}| < 2$ (3)  $\quad F_1/6 < |r_{12}| < F_1/2, \ r_{12} < 0$ (4)  $\quad F_1/3.5 < f_9 < F_1/2.5$ (5)  $\quad F_1 < |f_{9.10}| < F_1/0.3, \ f_{9.10} < 0$ (6)  $\quad 15 < \frac{\nu_2 + \nu_3}{2} - \nu_1 < 35$ wherein $F_1$ is the resultant length of the first three lenses;
$f_9$ is the focal length of ninth lens;
$f_{9.10}$ is the resultant focal length of the ninth and tenth lenses;
$r_7$, $r_{12}$ and $r_{15}$ are the radii of curvatures respectively of the front face of the fourth lens, the front face of the seventh lens, and the rear face of the eighth lens; and
$\nu_1$, $\nu_2$ and $\nu_3$ are the Abbé or $\nu$ values of the first, second and third lenses respectively.

The first three lenses define a first stationary group in which the first lens is negative and the second and third lenses are positive; the fourth lens is negative, and the fifth and sixth lenses are negative and positive respectively and form a cemented unit with complimenting mating faces, the fourth, fifth and sixth lenses constituting an axially movable second group; the seventh lens is negative and is individually axially movable and with the positive eighth lens defines a third group; and the ninth, tenth and eleventh lenses define a stationary fourth group of the triplet type including positive ninth and eleventh lenses and a negative tenth lens. The second lens group is movable for focal length variation and the seventh lens is movable to maintain a stationary focal plane. The lens system is mounted in a barrel of conventional construction provided with cylindrical cams of known structure for moving the second lens group and the seventh lens in a coupled related manner so as not to shift the focal plane with a variation in the lens system focal length.

The above designated condition (1) functions to correct coma aberration with respect to rays of greater ray heights in the relative short focal length range of the lens system and also functions to balance the sine condition over the full local length range of the lens system.

Condition (2) serves to suitably balance spherical aberation and to suitably correct coma aberration by balancing $r_{12}$ and $r_{15}$.

Condition (3) restricts the range of condition (2) whereby to maintain spherical aberration and coma aberration in a properly corrected state.

Conditions (4) and (5) function to provide the lens system with a Pezval sum suitable for the object over the full focal length range.

Condition (6) functions to balance chromatic aberration in the first lens group and also to well balance the various aberrations which are inclined to be influenced by the action to maintain chromatic difference of magnification in a suitably corrected state over the whole lens system.

The zoom lens system of the present invention is of simple construction, requiring only eleven lenses, and in spite of this possesses a high degree of correction over a wide variation in focal length.

DESCRIPTION OF THE PREFERRED EMBODIMENT

Figure 1A:
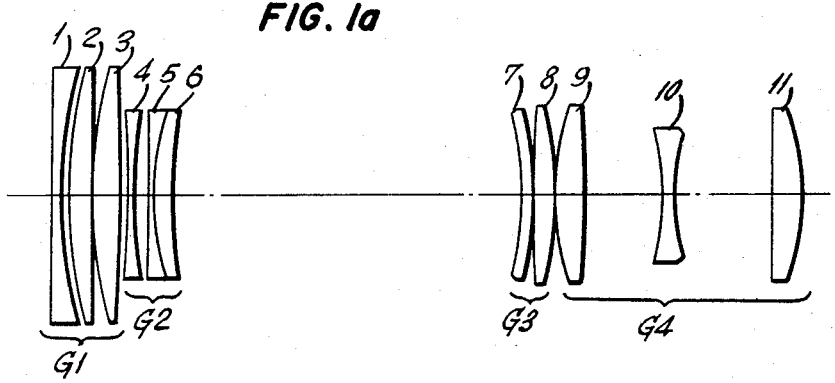
FIGURES 1(a), 1(b) and 1(c) are longitudinal sectional views of a lens system embodying the present invention and illustrated at minimum focal length, intermediate focal length and maximum focal length adjustments respectively.
Figure 1B:
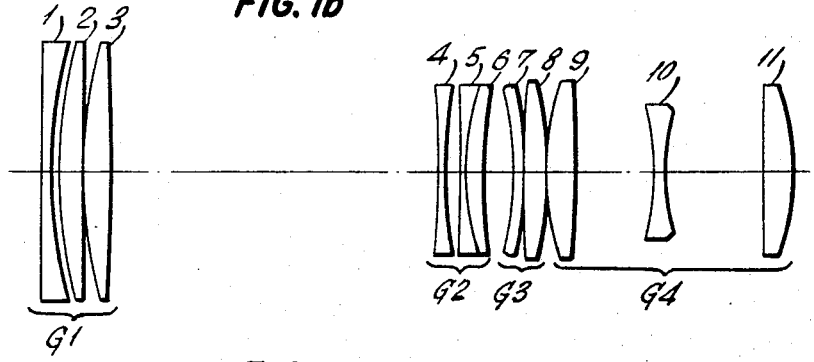
Figure 1C:
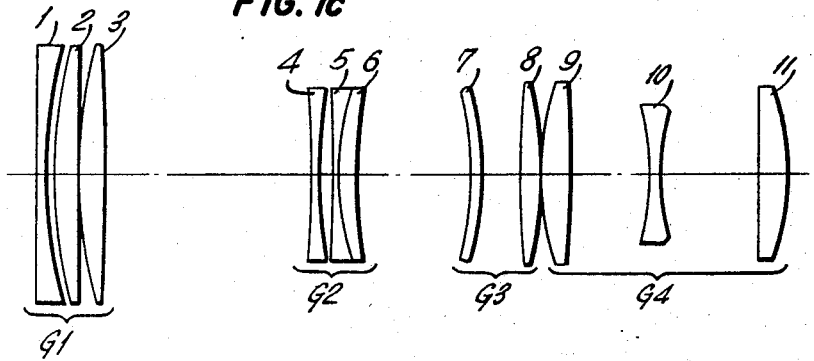

Referring now to the drawings and particularly FIGURE 1 thereof which illustrates a preferred embodiment of the present invention shown adjusted to minimum, intermediate and maximum focal lengths, the improved lens system includes eleven successive coaxially related lens 1 to 11 respectively arranged in four successive lens groups G1 to G4. Lens group G1 includes lenses 1, 2 and 3; lens group G2 includes lenses 4, 5 and 6; lens group G3 includes lenses 7 and 8; and lens group G4 is of the triplet type and includes lenses 9, 10 and 11. Conventional means are provided, as aforesaid, to relatedly axially move lens group G2 and lens 7 to vary the lens system focal length and maintain its focal plane stationary.

The first lens 1 is negative and has a thickness $d_1$, an index of refraction $n_1$, a front face of radius of curvature $r_1$, and a rear face of radius of curvature $r_2$; the second lens 2 is positive and spaced from the first lens 1 a distance $d_2$ and has a thickness $d_3$, an index of refraction $n_2$, a front face of radius of curvature $r_3$ and a rear face of radius of curvature $r_4$; and the third lens 3 is positive and is spaced a distance $d_4$ from the second lens 2 and has a thickness $d_5$, an index of refraction $n_3$, a front face of radius of curvature $r_5$, and a rear face of radius of curvature $r_6$.

The fourth lens 4 is negative and is spaced a variable distance $d_6$ from the third lens 3 and has a thickness $d_7$, an index of refraction $n_4$, a front face of radius of curvature $r_7$, and a rear face of radius of curvature $r_8$; and the fifth and sixth lens are a cemented unit with contiguous confronting mating faces, the fifth lens being negative and being spaced from the fourth lens 4 a distance $d_8$, and having a thickness $d_9$, and index of refraction $n_5$, a front face of radius of curvature $r_9$ and a rear face of radius of curvature $r_{10}$; and the sixth lens being positive and abutting and cemented to the fifth lens 5, and having a thickness $d_{10}$, an index of refraction $n_6$, a front face of radius of curvature $r_{10}$ and a rear face of curvature $r_{11}$.

The seventh lens 7 is negative lens and is spaced a variable distance $d_{11}$ from the sixth lens 6 and has a thickness $d_{12}$, an index refraction $n_7$, a concave front face of radius of curvature $r_{12}$ and a convex rear face of radius of curvature $r_{13}$; and the eighth lens 8 is positive and spaced a variable distance $d_{13}$ from the seventh lens 7 and has a thickness $d_{14}$, an index of refraction $n_8$, a front face of radius of curvature $r_{14}$ and a rear face of radius of curvature $r_{15}$.

The ninth lens 9 is positive and spaced from the eighth lens 8 a distance $d_{15}$ and has a thickness $d_{16}$, an index of refraction $n_9$, a convex front face of radius of curvature $r_{16}$ and a rear face of radius of curvature $r_{17}$; the tenth lens 10 is negative and spaced from the ninth lens a distance $d_{17}$ and has a thickness $d_{18}$, an index of refraction $n_{10}$, a concave front face of radius of curvature $r_{18}$ and a concave rear face of radius of curvature $r_{19}$; and the eleventh lens 11 is positive and is spaced a distance $d_{19}$ from the tenth lens 10 and has a thickness $d_{20}$, an index of refraction $n_{11}$, a front face of radius of curvature $r_{20}$ and a convex rear face of radius of curvature $r_{21}$.

It should be noted that distances between lenses are axially measured between the confronting faces of adjacent lenses and the lens thicknesses are also axially measured.

The following Table 1 sets forth the dimensions and parameters of a specific example of the present lens system having a focal length variable between 85 mm. and 205 mm. The radii of curvatures $r_n$ of the lens faces, and the lens spacings and thicknesses $d_n$ are as above designated, and the indices of refraction $n_n$ and the Abbé numbers $n$ are the numerators and denominators respectively of the correspondingly designated lens refractive indices $n_n$.

TABLE 1

| | | | | | |
|---|---|---|---|---|---|
| $r_1$ | −3,000.000 | $d_2$ | 1.50 | | |
| | | $d_1$ | 1.50 | $n_1$ | 1.66680/33.1 |
| $r_2$ | 91.640 | $d_2$ | 1.50 | | |
| $r_3$ | 101.200 | | | | |
| | | $d_3$ | 4.50 | $n_2$ | 1.61405/55.1 |
| $r_4$ | 4,545.063 | $d_4$ | 0.10 | | |
| $r_5$ | 102.000 | | | | |
| | | $d_5$ | 5.00 | $n_3$ | 1.62280/56.9 |
| $r_6$ | −746.474 | $d_6$ | 2.00∼64.78 | | |
| $r_7$ | −145.000 | | | | |
| | | $d_7$ | 1.00 | $n_4$ | 1.51633/64.1 |
| $r_8$ | 127.275 | $d_8$ | 2.50 | | |
| $r_9$ | −350.000 | | | | |
| | | $d_9$ | 1.00 | $n_5$ | 1.64000/60.2 |
| $r_{10}$ | 43.860 | $d_{10}$ | 3.00 | $n_6$ | 1.74077/27.7 |
| $r_{11}$ | 104.599 | | | | |
| | | $d_{11}$ | 68.50∼5.72 | | |
| $r_{12}$ | −50.000 | | | | |
| | | $d_{12}$ | 2.00 | $n_7$ | 1.66446/35.9 |
| $r_{13}$ | −72.889 | $d_{13}$ | 0.10∼7.41 | | |
| $r_{14}$ | 350.000 | | | | |
| | | $d_{14}$ | 4.00 | $n_8$ | 1.51633/64.1 |
| $r_{15}$ | −68.458 | $d_{15}$ | 0.10 | | |
| $r_{16}$ | 53.000 | | | | |
| | | $d_{16}$ | 5.30 | $n_9$ | 1.62041/60.3 |
| $r_{17}$ | −152.064 | $d_{17}$ | 15.00 | | |
| $r_{18}$ | −45.200 | | | | |
| | | $d_{18}$ | 2.50 | $n_{10}$ | 1.64769/33.9 |
| $r_{19}$ | 53.698 | $d_{19}$ | 18.50 | | |
| $r_{20}$ | 1,000.000 | | | | |
| | | $d_{20}$ | 5.00 | $n_{11}$ | 1.58913/61.2 |
| $r_{21}$ | −46.238 | | | | |

$F = 85 \sim 205$.

The following Tables 2 and 3 set forth the Seidel coefficients of the lens system of the specific example of Table 1, with a stop positioned between the ninth lens 9 and the tenth lens 10, Table 2 being for the lens system adjusted to minimum focal length and Table 3 being for lens system adjusted to maximum focal length.

TABLE 2

| | $S_1$ | $S_2$ | $S_3$ | P | $S_5$ |
|---|---|---|---|---|---|
| 1 | −0.000 | 0.000 | −0.007 | −0.011 | 0.664 |
| 2 | −1.545 | 0.185 | −0.022 | −0.371 | 0.047 |
| 3 | 1.326 | −0.101 | 0.007 | 0.310 | −0.025 |
| 4 | −0.001 | −0.010 | −0.065 | −0.007 | −0.436 |
| 5 | 0.268 | 0.081 | 0.024 | 0.319 | 0.104 |
| 6 | 0.108 | −0.259 | 0.618 | 0.043 | −1.577 |
| 7 | −0.432 | 0.697 | −1.122 | −0.199 | 2.129 |
| 8 | −0.166 | −0.096 | −0.055 | −0.227 | −0.163 |
| 9 | 0.000 | −0.003 | −0.054 | −0.094 | 0.599 |
| 10 | 0.942 | −0.297 | 0.094 | 0.068 | −0.051 |
| 11 | −1.634 | −0.107 | −0.007 | −0.023 | −0.023 |
| 12 | −1.107 | 0.437 | −0.172 | −0.678 | 0.336 |
| 13 | −0.226 | 0.238 | −0.250 | 0.465 | −0.225 |
| 14 | 3.605 | 1.086 | 0.327 | 0.082 | 0.123 |
| 15 | 3.246 | −1.138 | 0.399 | 0.422 | −0.288 |
| 16 | 7.360 | 1.249 | 0.212 | 0.614 | 0.140 |
| 17 | 24.016 | −5.891 | 1.445 | 0.214 | −0.407 |
| 18 | −46.531 | 6.343 | −0.864 | −0.739 | 0.218 |
| 19 | −5.112 | −2.119 | −0.878 | −0.622 | −0.622 |
| 20 | 0.149 | 0.222 | 0.330 | 0.331 | 0.539 |
| 21 | 17.920 | 0.021 | 0.000 | 0.681 | 0.000 |
| Sum | 2.186 | 0.538 | 0.670 | −0.033 | 1.084 |

TABLE 3

| | $S_1$ | $S_2$ | $S_3$ | P | $S_5$ |
|---|---|---|---|---|---|
| 1 | −0.000 | 0.001 | −0.018 | −0.027 | 0.707 |
| 2 | −21.744 | 12.508 | −7.194 | −0.895 | 4.654 |
| 3 | 18.661 | −10.398 | 5.793 | 0.771 | −3.658 |
| 4 | −0.025 | −0.050 | −0.098 | −0.017 | −0.227 |
| 5 | 3.781 | −1.512 | 0.604 | 0.772 | −0.550 |
| 6 | 1.533 | −2.318 | 3.506 | 0.105 | −5.462 |
| 7 | −2.272 | 2.441 | −2.622 | −0.481 | 3.335 |
| 8 | −0.080 | −0.115 | −0.165 | −0.548 | −1.024 |
| 9 | −0.028 | 0.095 | −0.321 | −0.228 | 1.847 |
| 10 | 1.663 | 0.073 | 0.003 | 0.165 | 0.007 |
| 11 | −1.989 | −1.083 | −0.589 | −0.834 | −0.775 |
| 12 | −0.458 | 0.437 | −0.417 | −1.638 | 1.960 |
| 13 | −0.093 | 0.236 | −0.605 | 1.123 | −1.316 |
| 14 | 1.493 | 1.086 | 0.791 | 0.199 | 0.720 |
| 15 | 1.344 | −1.138 | 0.963 | 1.020 | −1.679 |
| 16 | 3.049 | 1.249 | 0.512 | 1.482 | 0.817 |
| 17 | 9.948 | −5.891 | 3.489 | 0.516 | −2.372 |
| 18 | −19.274 | 6.343 | −2.087 | −1.784 | 1.274 |
| 19 | −2.117 | −2.119 | −2.120 | −1.502 | −3.625 |
| 20 | 0.061 | 0.222 | 0.799 | 0.076 | 3.141 |
| 21 | 7.423 | 0.021 | 0.000 | 1.645 | 0.004 |
| Sum | 0.875 | 0.092 | 0.220 | −0.081 | −2.219 |

Figure 2A:
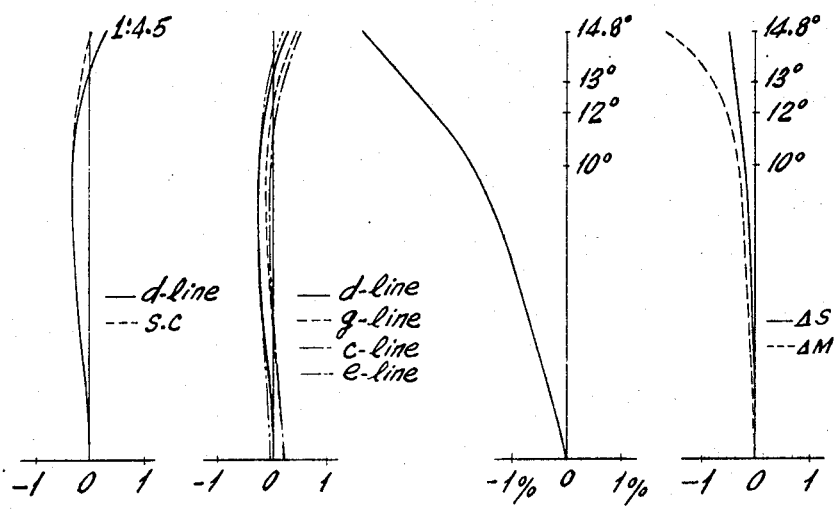
FIGURES 2(a), 2(b) and 2(c) are sets of aberration curves at minimum focal length, intermediate focal length and maximum focal length adjustments respectively.
Figure 2B:
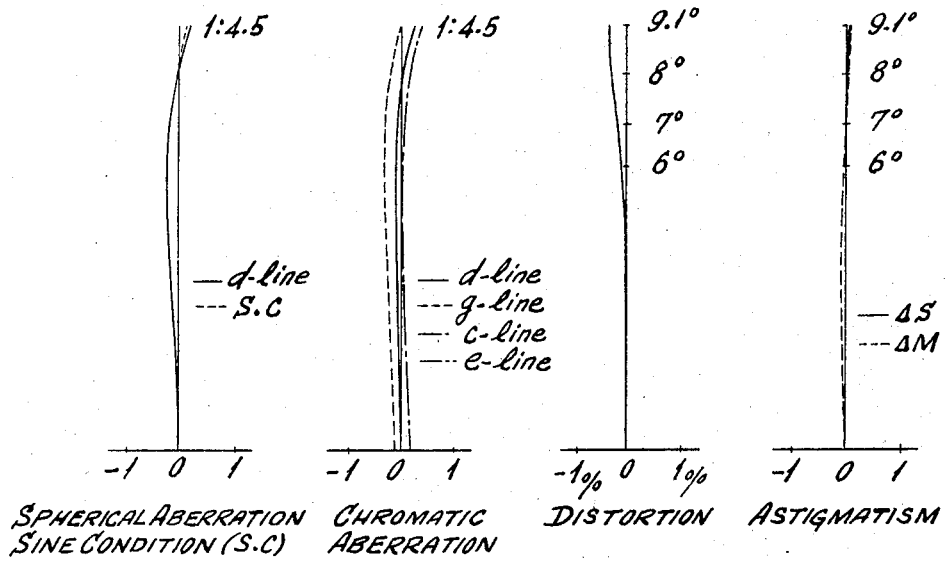
Figure 2C:
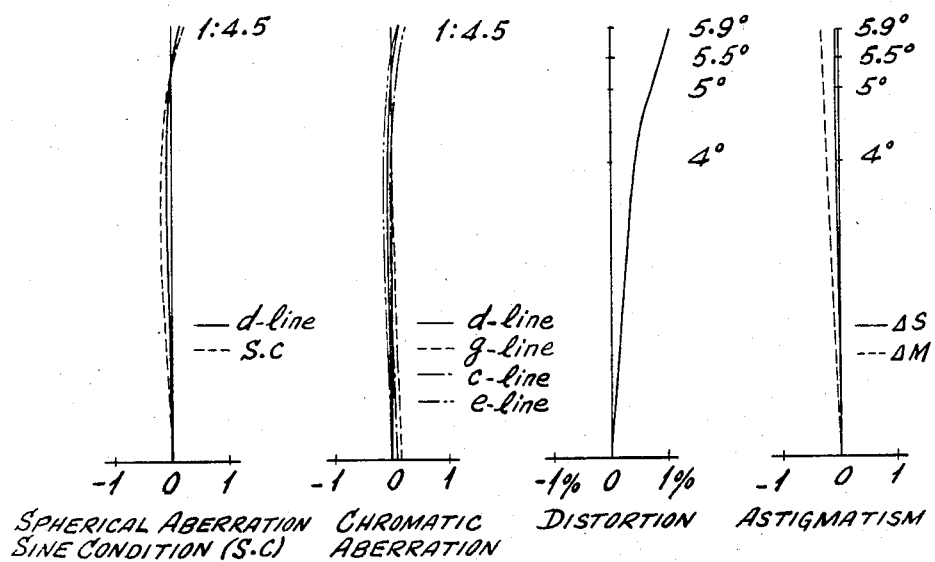

As seen in FIGURES 2(a), (b) and (c) of the drawings which illustrate the spherical aberration and sine condition, chromatic aberration, distortion, and astigmatism curves of the specific lens system at minimum, intermediate and maximum focal length, highly suitable correction in a zoom lens system is effected over the full focal lens variation range in spite of the fact that only eleven lenses are employed.

While there has been described and illustrated a preferred embodiment of the present invention, it is apparent that numerous alterations, omissions and additions may be made without departing from the spirit thereof.

I claim:
1. A variable focal length lens system comprising eleven lenses consecutively designated as the first to the eleventh lens, the fifth and sixth lenses constituting a cemented doublet, the lens faces being consecutively designated as the first to the twenty-first face with the confronting mating surfaces of the fifth and sixth lenses defining a single lens face, and possessing the following dimensions and parameters:

| | | | | | |
|---|---|---|---|---|---|
| $r_1$ | −3,000.000 | $d_1$ | 1.50 | $n_1$ | 1.66680/33.1 |
| $r_2$ | 91.640 | $d_2$ | 1.50 | | |
| $r_3$ | 101.200 | $d_3$ | 4.50 | $n_2$ | 1.61405/55.1 |
| $r_4$ | 4,545.063 | $d_4$ | 0.10 | | |
| $r_5$ | 102.000 | $d_5$ | 5.00 | $n_3$ | 1.62280/56.9 |
| $r_6$ | −746.474 | $d_6$ | 2.00~64.78 | | |
| $r_7$ | −145.000 | $d_7$ | 1.00 | $n_4$ | 1.51633/64.1 |
| $r_8$ | 127.275 | $d_8$ | 2.50 | | |
| $r_9$ | −350.000 | $d_9$ | 1.00 | $n_5$ | 1.64000/60.2 |
| $r_{10}$ | 43.860 | $d_{10}$ | 3.00 | $n_6$ | 1.74077/27.7 |
| $r_{11}$ | 104.599 | $d_{11}$ | 68.50~5.72 | | |
| $r_{12}$ | −50.000 | $d_{12}$ | 2.00 | $n_7$ | 1.66446/35.9 |
| $r_{13}$ | −72.889 | $d_{13}$ | 0.10~7.41 | | |
| $r_{14}$ | 350.000 | $d_{14}$ | 4.00 | $n_8$ | 1.51633/64.1 |
| $r_{15}$ | −68.458 | $d_{15}$ | 0.10 | | |
| $r_{16}$ | 53.000 | $d_{16}$ | 5.30 | $n_9$ | 1.62041/60.3 |
| $r_{17}$ | −152.064 | $d_{17}$ | 15.00 | | |
| $r_{18}$ | −45.200 | $d_{18}$ | 2.50 | $n_{10}$ | 1.64769/33.9 |
| $r_{19}$ | 53.698 | $d_{19}$ | 18.50 | | |
| $r_{20}$ | 1,000.000 | $d_{20}$ | 5.00 | $n_{11}$ | 1.58913/61.2 |
| $r_{21}$ | −46.238 | | | | |

$F = 85 \sim 205$.

wherein $r_i$ is the radius of curvature of the $i$th lens face, $d_i$ is the distance between the $i$th lens face and the next successive lens face, and $n_n$ is the index of refraction and Abbé value of the $n$th lens, the fourth, fifth and sixth lenses being axially movable as a group and the seventh lens being axially movable.

References Cited

UNITED STATES PATENTS 3,074,318  1/1963  Yamaji _____ 350—184

FOREIGN PATENTS 1,008,309  10/1965  Great Britain.

JOHN K. CORBIN, Primary Examiner

U.S. Cl. X.R.

350—214